(12) United States Patent
Ebrahimi Warkiani et al.

(10) Patent No.: US 9,327,217 B2
(45) Date of Patent: May 3, 2016

(54) MULTILAYER FILTER

(71) Applicant: Nanyang Technological University, Singapore (SG)

(72) Inventors: Majid Ebrahimi Warkiani, Singapore (SG); Haiqing Gong, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 82 days.

(21) Appl. No.: 14/346,392

(22) PCT Filed: Sep. 20, 2012

(86) PCT No.: PCT/SG2012/000343
§ 371 (c)(1),
(2) Date: Mar. 21, 2014

(87) PCT Pub. No.: WO2013/043124
PCT Pub. Date: Mar. 28, 2013

(65) Prior Publication Data
US 2014/0223873 A1    Aug. 14, 2014

(30) Foreign Application Priority Data

Sep. 21, 2011 (SG) .................. 201106927-5

(51) Int. Cl.
*B01D 29/05* (2006.01)
*B01D 67/00* (2006.01)
(Continued)

(52) U.S. Cl.
CPC .............. *B01D 29/05* (2013.01); *B01D 39/083* (2013.01); *B01D 46/10* (2013.01); *B01D 67/0034* (2013.01); *B01D 67/0062* (2013.01); *B01D 2239/065* (2013.01);
(Continued)

(58) Field of Classification Search
CPC ..... B01D 61/18; B01D 63/82; B01D 2325/21
USPC ................................ 55/489; 210/488; 29/428
See application file for complete search history.

(56) References Cited

U.S. PATENT DOCUMENTS

| 5,543,046 A | 8/1996 | Van Rijn |
| 5,753,014 A | 5/1998 | Van Rijn |
| 6,044,981 A | 4/2000 | Chu et al. |

(Continued)

FOREIGN PATENT DOCUMENTS

| JP | 2009119447 A | 6/2009 |
| WO | 9749475 | 12/1997 |

OTHER PUBLICATIONS

Inoue M, Rai S K, Oda T, Kimura K, Nakanishi M, Hotta H and Uga S 2003 A new filter-eluting solution that facilitates improved recovery of Cryptosporidium oocysts from water Journal of Microbiological Methods 55 679-86.

(Continued)

*Primary Examiner* — Jason M Greene
*Assistant Examiner* — Karla Hawkins

(57) ABSTRACT

This invention relates to a multilayer filter. The filter comprises at least a first layer comprising a plurality of openings and at least a second permeable layer overlaying the first layer and reducing the size of the openings. The filter may further comprise one or more successive layers overlaying the second layer, wherein each layer further successively reduces the size of the openings. The filter may be used for separation of particles from fluid or gas. There is also provided a method for fabricating a multilayer filter.

18 Claims, 9 Drawing Sheets

(51) Int. Cl.
*B01D 39/08* (2006.01)
*B01D 46/10* (2006.01)

(52) U.S. Cl.
CPC .. *B01D 2239/1216* (2013.01); *B01D 2325/021* (2013.01); *Y10T 29/49826* (2015.01)

(56) References Cited

U.S. PATENT DOCUMENTS

| | | | |
|---|---|---|---|
| 2002/0162791 | A1 | 11/2002 | Jacobson |
| 2006/0062688 | A1* | 3/2006 | Lawrence ................. 422/56 |
| 2009/0188864 | A1* | 7/2009 | Zheng et al. ............... 210/641 |
| 2011/0052900 | A1 | 3/2011 | Uno et al. |

OTHER PUBLICATIONS

Noble R T and Weisberg S B 2005 A review of technologies for rapid detection of bacteria in recreational waters Journal of water and health. 3 381-92.

Dubitsky A, DeCollibus D and Ortolano G A 2002 Sensitive fluorescent detection of protein on nylon membranes Journal of Biochemical and Biophysical Methods 51 47-56.

Ramachandran V and Fogler H S 1999 Plugging by hydrodynamic bridging during flow of stable colloidal particles within cylindrical pores Journal of Fluid Mechanics 385 129-56.

Yanagishita T, Nishio K and Masuda H 2007 Polymer through-hole membrane fabricated by nanoimprinting using metal molds with high aspect ratios Journal of Vacuum Science and Technology B: Microelectronics and Nanometer Structures 25 L35-L8.

Han K, Xu W, Ruiz A, Ruchhoeft P and Chellam S 2005 Fabrication and characterization of polymeric microfiltration membranes using aperture array lithography Journal of Membrane Science 249 193-206.

Gironès M, Akbarsyah I J, Nijdam W, van Rijn C J M, Jansen H V, Lammertink R G H and Wessling M 2006 Polymeric microsieves produced by phase separation micromolding Journal of Membrane Science 283 411-24.

Lorenz H, Despont M, Fahrni N, Brugger J, Vettiger P and Renaud P 1998 High-aspect-ratio, ultrathick, negative-tone near-UV photoresist and its applications for MEMS Sensors Actuators A 64 33-9.

Yi F, Tang E, Zhang J and Xian D 2000 A new sacrificial layer method of LIGA technology to fabricate movable part of a gripper Microsystem Technologies 6 154-6.

Calleja M, Tamayo J, Johansson A, Rasmussen P, Lechuga L and Boisen A 2003 Polymeric cantilever arrays for biosensing applications Sensor letters 1 1-5.

Luo C, Govindaraju A, Garra J, Schneider T, White R, Currie J and Paranjape M 2004 Releasing SU-8 structures using polystyrene as a sacrificial material Sensors and Actuators, A: Physical 114 123-8.

Foreign Communication from a Related Counterpart Application, International Search Report and Written Opinion dated Feb. 8, 2013, International Application No. PCT/SG12/00343 filed on Sep. 20, 2012.

Warkiani, M.E., et al. "Fabrication and characterization of a microporous polymeric micro-filter for isolation of Cryptosporidium parvum oocysts", Journal of Micromechanics and Microengineering, 2011, vol. 21, art No. 035002.

Wohlsen, T, et al., 2004 Evaluation of Five Membrane Filtration Methods for Recovery of Crytosporidium and Giardia Isolates from Water Samples Applied and Environmental Microbiology 70 2318-22.

Kuiper, S. et al., 998 Development and applications of very high flux microfilitration membranes Journal of Membrane Science 150 1-8.

\* cited by examiner

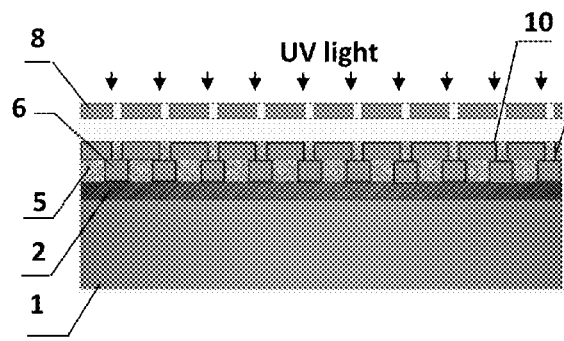
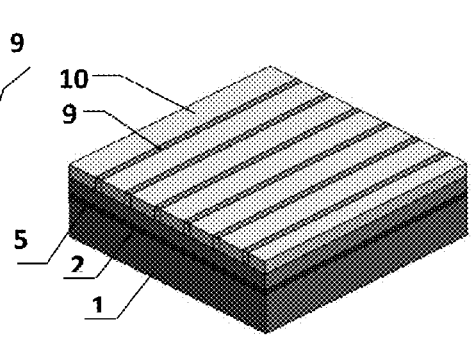
Figure 3(i)      Figure 3(j)
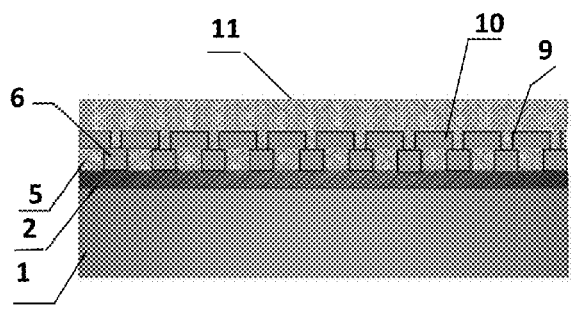
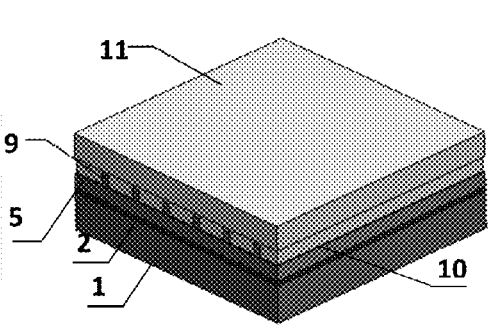
Figure 3(k)      Figure 3(l)
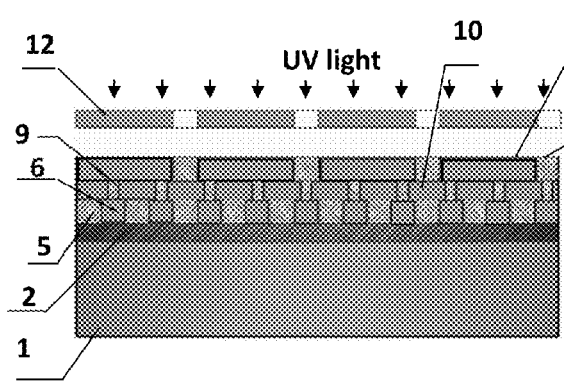
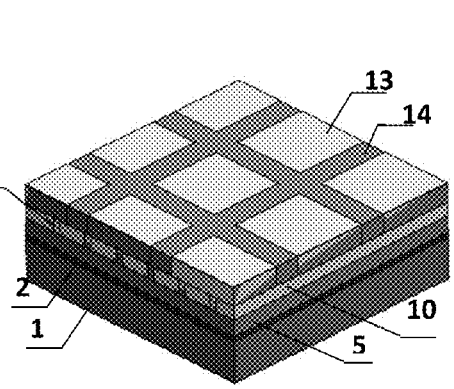
Figure 3(m)      Figure 3(n)

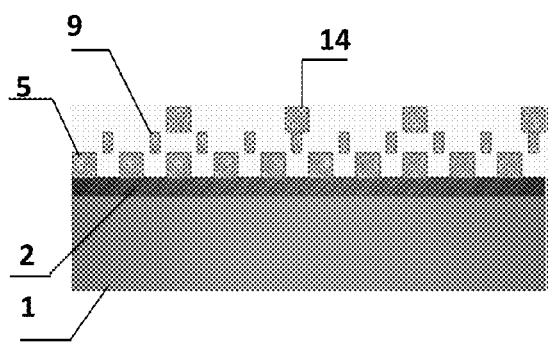
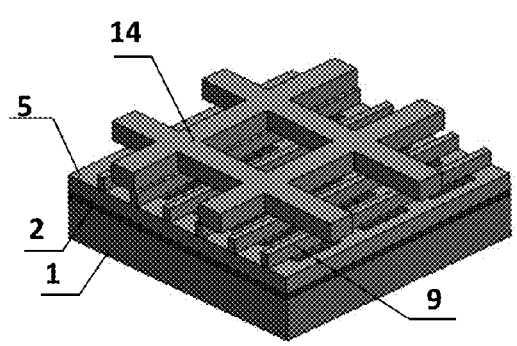
Figure 3(o)　　　　　　　　Figure 3(p)
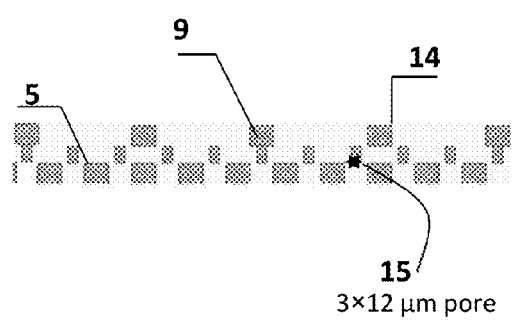
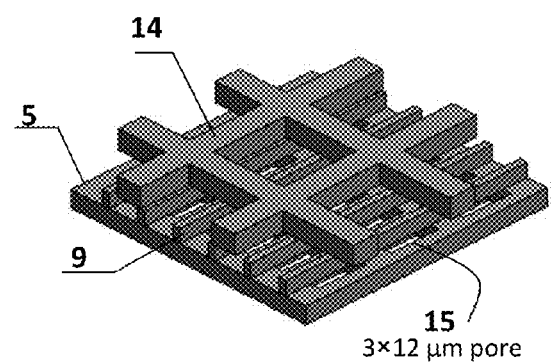
Figure 3(q)　　　　　　　　Figure 3(r)

MULTILAYER FILTER

CROSS-REFERENCE TO RELATED APPLICATIONS

The present application is a National Stage application of International Application No. PCT/SG2012/000343. International Application No. PCT/SG2012/000343 was filed in the Intellectual Property Office of Singapore within one-year of and claims priority to Singapore Application No. 201106927-5. Accordingly, this application is a filing under 35 U.S.C. 371 as the National Stage of International Application No. PCT/SG2012/000343, filed Sep. 20, 2012, entitled "A MULTILAYER FILTER," by Majid EBRAHIMI WARKIANI, et al., and claims foreign priority under 35 U.S.C. 119 to Singapore Patent Application No. 201106927-5, filed with the Intellectual Property Office of Singapore on Sep. 21, 2011 and entitled "A MULTILAYER FILTER", by Majid EBRAHIMI WARKIANI, et al., each of which are incorporated herein by reference in their entirety for all purposes.

FIELD OF THE INVENTION

The present invention relates to a multilayer filter and methods for fabricating and preparing the same. In particular, the filter device is for separation of particles from either fluid or gas. For example, the filter can be used for, but not limited to applications like isolation of waterborne pathogens, blood filtration, cell harvesting, and removal of unwanted particles from other food and industrial fluid made of liquid, gas (air) or a mixture of liquid and gas.

BACKGROUND OF THE INVENTION

In environmental, physical, chemical and microbiological studies, filtration is often used to concentrate small particles (e.g. microbial cells) suspended in minute concentration in fluids or gases. In general, it may be necessary to separate and concentrate small particles according to the particle dimension. Further, it is desirable to rapidly and completely capture these small particles on a filter.

For example, filtration-based particle concentration techniques have been used to isolate and recover waterborne pathogens into small volume for downstream analysis. Such isolated/recovered microorganisms are more readily accessible to different detection methods using fluorescent probes. For example, *Cryptosporidium parvum* oocyst is a parasite commonly found in surface waters such as lakes and rivers, especially when the water is in contact with animal wastes and sewage. The highly infectious nature of *C. parvum* oocyst and the lack of effective medication until now urge a reliable routine test to monitor *C. parvum* oocyst contamination in the drinking water supply system [1]. Available bio-sensors only detect microorganisms which are directly in contact with the sensitive region; hence, detection of low concentration bacteria in a large volume is hard because there is low possibility for bacteria to interact with the sensitive zone of biosensor [2]. Consequently, a reliable method to concentrate *C. parvum* oocysts present in large volume of drinking water into smaller volume is crucial for accurate detection and quantification of *C. parvum* oocysts from drinking water. Filtration-based concentration techniques have been widely used for capturing and recovering *C. parvum* oocysts into small volume for downstream analysis [3].

Negative features of commercial filters like rough surface, tortuous pore path, low pore density and high coefficient of variation [4] (CV>20%) are the major factors which compromise their efficiency and throughput during microfiltration. The best homogeneity in terms of pore size distribution and pore shape in commercial membranes is possessed by the track-etched polymeric membranes (normally polycarbonate) by cylindrical pores, but the irregular array of pores on the surface, low porosity and also their angle with the surface limits the strength, flow rate and reliability of them in repeated process-scale. Therefore, these filters are normally employed in single-use laboratory analysis [3,5].

From the last decades, different methods have been proposed to produce membranes with micro/nano cylindrical pores, high porosity and good mechanical strength. For instance, optical lithography has been employed to fabricate silicon nitride membranes with a pore size of around 0.1 µm. Identical and uniform pore diameter and smooth surface allow the filtration membrane to have low transmembrane pressures and large flux, but the restriction in membrane material (limited to nitride) and small thickness of the silicon nitride film (<1 µm), which allows only low working pressure (<2 bar) limits the application of this type of filtration membrane [6,7]. Fabrication of polymeric through-hole membrane using high aspect ratio metal moulds with a hole-diameter down to hundreds of nanometers is also investigated by Yanagishita et al. [8]. A major impediment in fabrication of membrane with this method is the demoulding of cured membrane, because peeling off of the membrane from the mould often results in membrane damage and failure. Furthermore, the choices of pore size and pore density are restricted due to the use of alumina templates. In another study, polymeric sieves have been fabricated using aperture array lithography [9]. In this method, aperture array lithography and reactive ion etching (RIE) techniques have been combined to obtain polymeric membranes with a homogeneous pore diameter on the scale of hundreds of nanometers, but it is a costly process which is not appropriate for large-scale production. More recently, polymeric membranes were obtained by phase separation micromolding [10]. In spite of capability of this method in employing a variety of polymers for filter design, some major problems such as enlargement of pore size during the shrinkage stage, fragility of the mould and folding (or failure) of membrane during the release stage are associated with this method.

In all the aforementioned methods, it is difficult or perhaps even impossible to make a membrane with small features (i.e. down to hundreds of nanometer) without compromising the membrane strength. As a "rule of thumb," for instance, the diameter or the largest transverse dimension of the pore cannot be smaller than about half of the membrane thickness [7]. Hence, in order to obtain membrane with pore size of around 1 µm or less, the membrane thickness would be smaller than 2 µm which is so fragile that it cannot be used for microfiltration applications.

It is therefore desirable to further improve on filters and fabrication methods of filters. Technically, fabrication of small perforations (e.g 0.1-5 µm) inside a thick photoresist film (e.g. SU-8) is difficult due to the tapering effect, which normally happens during UV exposure (i.e. usually, the top layer is overexposed and tends to be wider than the bottom layer which is relatively underexposed, resulting in variation in the lateral dimensions).

SUMMARY OF THE INVENTION

In general terms, the invention relates to a multilayer filter. The filter may be a polymeric micro/nano-filter, including micro/nano-scale precision-shaped pores (e.g. slotted shape) suitable for a wide variety of applications, and a support layer that includes a precision-shaped porous support for the membrane; the invention also relates to methods of fabricating and preparing the multilayer filter.

According to a first aspect, the invention provides a multilayer filter comprising at least a first layer comprising a plurality of openings and at least a second permeable layer overlaying the first layer and reducing the size of the openings.

There is also provided a method for fabricating a multilayer filter, comprising the steps of:
(i) depositing a sacrificial layer on a substrate;
(ii) depositing a first layer onto the sacrificial layer; either
A) (iii) identifying on the first layer a first pattern comprising regions to be removed so as to form a plurality of openings in the first layer;
(iv) depositing at least a second layer to overlay the first layer;
(v) identifying on the second layer a second pattern comprising regions to be removed so as to form a configuration in the second layer; and fabricating a plurality of openings in the first layer according to the first pattern and fabricating a configuration in the second layer according to the second pattern, wherein the configuration reduces the size of the openings of the first layer; or
B(iii) fabricating a plurality of openings in the first layer;
(iv) depositing at least a second layer to overlay the first layer;
(v) fabricating a configuration in the second layer, wherein the configuration reduces the size of the openings of the first layer;
and for (A) or (B), (vi) releasing the layers minus the sacrificial layer from the substrate to give the multilayer filter.

According to another aspect, the invention relates to a method of preparing a filter comprising the steps of:
(i) fabricating a first layer comprising a plurality of openings;
(ii) fabricating at least a separate second permeable layer comprising a configuration;
(iii) positioning the second layer to overlay the first layer, wherein the configuration of the second layer reduces the size of the openings.

In particular, the configuration of the second layer partitions the openings (of the first layer), thereby reducing the size of the openings.

BRIEF DESCRIPTION OF THE FIGURES

Reference numerals indicated in the drawings and referred to in the detailed description are intended for illustrative purposes only and should not be construed as limited to the particular structure indicated in the drawings.

FIG. 12 (b) shows various shapes of pore openings having high aspect-ratio.

DETAILED DESCRIPTION OF THE INVENTION

Figure 1:
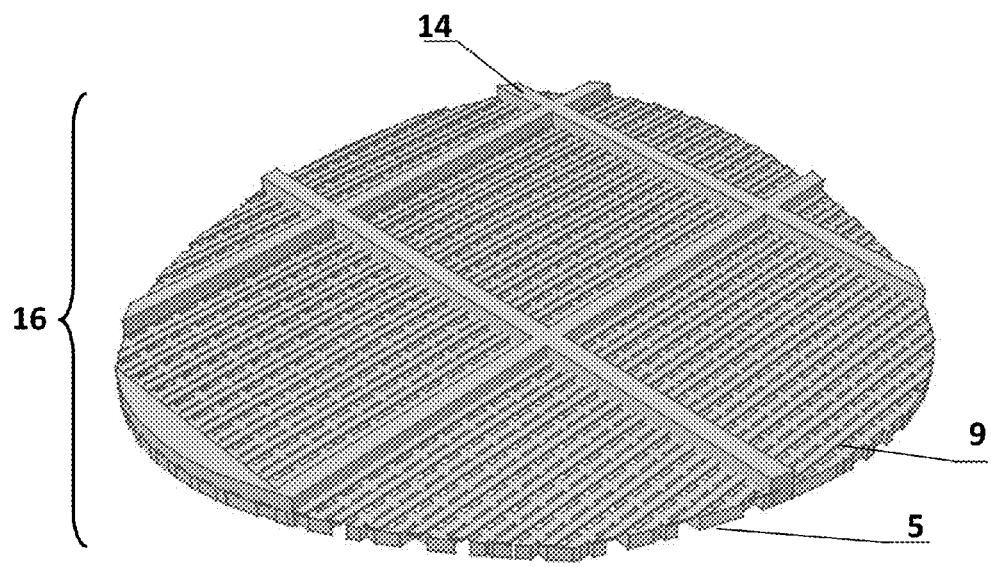
FIG. 1 is a cut-view of the multilayer micro-fabricated membrane embodying the present invention.

The multilayer filter comprises at least a first layer comprising a plurality of openings and at least a second permeable layer overlaying the first layer and reducing the size of the openings. In particular, the overlaying second layer comprises a configuration partitioning substantially every individual opening to reduce its size. The multilayer filter may further comprise one or more successive layers overlaying the second layer, wherein each layer further successively reduces the size of the openings. The term opening(s) may be used interchangeably with the term pore(s).

The current filter comprises several layers which at least one or two of them forms the membrane and at least one or two of them forms the support structure to reinforce the membrane. By employing this technique, robust membranes with slotted pore shape can be manufactured.

The openings may be of any suitable shape. For example, the openings may be quadrilateral or oval shaped. In particular, the openings may be rectangles or squares. Further, the openings may be substantially uniform in size and arranged in a substantially regular array. In particular, the configuration of the second layer comprises an array of strips partitioning the openings.

The openings of the filter may be of any suitable size. For example, the largest dimension of an opening may be ≤500 μm. In particular, the largest dimension of an opening may be from ~10 nm to ~500 μm.

Accordingly, the filter membrane of the present invention has slotted pores (rectangular shape) with different width (i.e. 10 nm to 50 μm) depending on the width of strips on the second layer. The length of the rectangular pore can also be varied from 50 nm to 200 μm. The exact pore size also depends on the desired application. For example, a filter membrane having a pore size equal to 0.45 μm would be suitable for filtering bacteria such as E. coli, as well as other matters of similar size, from liquid. Pore size of around 3 μm is also ideal to remove dangerous protozoa such as C. parvum oocysts from drinking water or can be used for diagnostic and microscopic applications.

According to a particular aspect, the largest dimension of an opening is less than or equal to half the thickness of the multilayer filter.

Any suitable material may be used for the filter. For example, each layer of the multilayer filter may be independently polymeric, metallic, silicon or a gel.

The filter may further comprise at least one supporting permeable layer. The supporting permeable layer may comprise a grid structure. The supporting permeable layer may comprise silicon, plastics or metal.

In general, the layers of the multilayer filter are coherent. In particular, the layers including the supporting permeable layers are coherent. The term "coherent" is given its ordinary meaning of "logically or aesthetically ordered or integrated". The invention also includes a method for fabricating a multilayer filter according to any aspect of the invention as described herein.

For example, the method comprises the steps of:
(i) depositing a sacrificial layer on a substrate;
(ii) depositing a first layer onto the sacrificial layer; either
A)(iii) identifying on the first layer a first pattern comprising regions to be removed so as to form a plurality of openings in the first layer;
(iv) depositing at least a second layer to overlay the first layer;
(v) identifying on the second layer a second pattern comprising regions to be removed so as to form a configuration in the second layer; and fabricating a plurality of openings in the first layer according to the first pattern and fabricating a configuration in the second layer according to the second pattern, wherein the configuration reduces the size of the openings of the first layer; or
B(iii) fabricating a plurality of openings in the first layer;
(iv) depositing at least a second layer to overlay the first layer;
(v) fabricating a configuration in the second layer, wherein the configuration reduces the size of the openings of the first layer;
and for (A) or (B), (vi) releasing the layers minus the sacrificial layer from the substrate to give the multilayer filter.

In particular, the configuration (of the second layer) partitions substantially every individual openings (in the first layer), thereby reducing the size of the openings.

For instance, step (ii) comprises depositing a first photoresist layer onto the sacrificial layer. For step A(iii), the first photoresist layer may then be contacted with a mask comprising a pattern of a plurality of openings to be copied to the first photoresist layer; exposing the masked first photoresist layer to a suitable light source. Alternatively, for step B(iii), the first photoresist layer may be contacted with a mask comprising a pattern of a plurality of openings to be copied to the first photoresist layer and performing photolithography to form a plurality of openings on the first photoresist layer.

Step A(iv) or B(iv) may comprise depositing at least a second photoresist layer onto the first layer. For step A(v), the second photoresist layer may be contacted with a mask comprising a pattern of a configuration to be copied to the second photoresist layer and exposing the masked second photoresist layer to a suitable light source or alternatively, for step B(v), the second photoresist layer may be contacted with a mask comprising a pattern of a configuration to be copied to the photoresist layer and performing photolithography to form a configuration on the second photoresist layer; wherein the configuration of the second layer reduces the size of the opening of the first layer.

According to a particular example, the openings in the first layer and the configuration in the second layer may be formed together. Accordingly, step A(v) further comprises removing the exposed regions of the first and second photoresist layers to form the configuration in the second photoresist layer and the openings in the first photoresist layer, wherein the configuration of the second layer reduces the size of the openings of the first layer. The configuration of the second layer partitions substantially every individual opening to reduce its size.

Any suitable photoresist may be used for fabricating the filter. For example, SU-8 (MicroChem Corp., Newton, Mass.) may be used for fabricating the filter. SU-8 is an epoxy-type photoresist [11]. Other examples of negative photoresist such as Polyimide, PMMA, PMGI and etc. may also be employed.

Further, for the method described above, the sacrificial layer may comprise a dissolvable material.

According to another aspect, the invention relates to a method of preparing a filter comprising the steps of:
(i) fabricating a first layer comprising a plurality of openings;
(ii) fabricating at least a separate second permeable layer comprising a configuration;
(iii) positioning the second layer to overlay the first layer, wherein the configuration of the second layer reduces the size of the openings.

The method according to any aspect of the invention may further comprise fabricating one or more successive permeable layers overlaying the second layer, wherein each layer further successively reduces the size of the openings. In particular, the method fabricates the largest dimension of an opening to less than or equal to half of the thickness of the multilayer filter.

The method according to any aspect of the invention may also further comprise fabricating at least one supporting permeable layer over the multilayer filter.

In an exemplary embodiment, the support layer is thicker than the membrane layer between 2 to 100 times. Also, the support layer can be made from another type of negative photoresist (other than SU-8, like Polyimide) with precision shape openings or even Silicon as well as PMMA and Polycarbonate (PC). Alternatively, a wide variety of support structures may be employed in the present invention to support the multilayer micro-fabricated membrane.

Further, the material of the support layer and membrane may be photosensitive (or photoimageable) and also suitable for radiation-based processes such as X-ray, UV, E-beam, photon beam and laser ablation. There is also the possibility to make the support with anisotropic/isotropic etching of Si or even prepare from PMMA or PC by laser cutting method, which will be described in great detail later.

The filter according to any aspect of the invention is for separating particles from a fluid.

Filtration with slotted membrane offers some interesting advantages over conventional filtration with circular pores. The initial rate of flux decline is slower for the membrane with slotted pores compared to the membrane with circular pores since the initial particle deposition only covers a small fraction of the pores. Furthermore, the membrane resistance during filtration is also much lower for the slotted pores compared to the circular pores.

The porosity of the membrane may be selected according to the intended application. In accordance with the present invention, the porosity of the membrane may be substantially higher than that found in the aforementioned methods since membrane has slotted pores and therefore pore density can be as high as 40 to 50%.

The same multilayer method to reduce the pore size can be used with other patterning techniques such as electron-beam lithography, x-ray lithography, transfer of pattern by stamping, nano-imprint lithography, inkjet or extrusion dispensing of materials to form a pattern, etc., which allows some of the techniques to generate smaller openings beyond their respective processing limits of these techniques when making the opening in a single layer of material.

Having now generally described the invention, the same will be more readily understood through reference to the following examples and figures which are provided by way of illustration, and are not intended to be limiting of the present invention.

EXAMPLE 1

Method of Preparing the Filter

Figure 2:
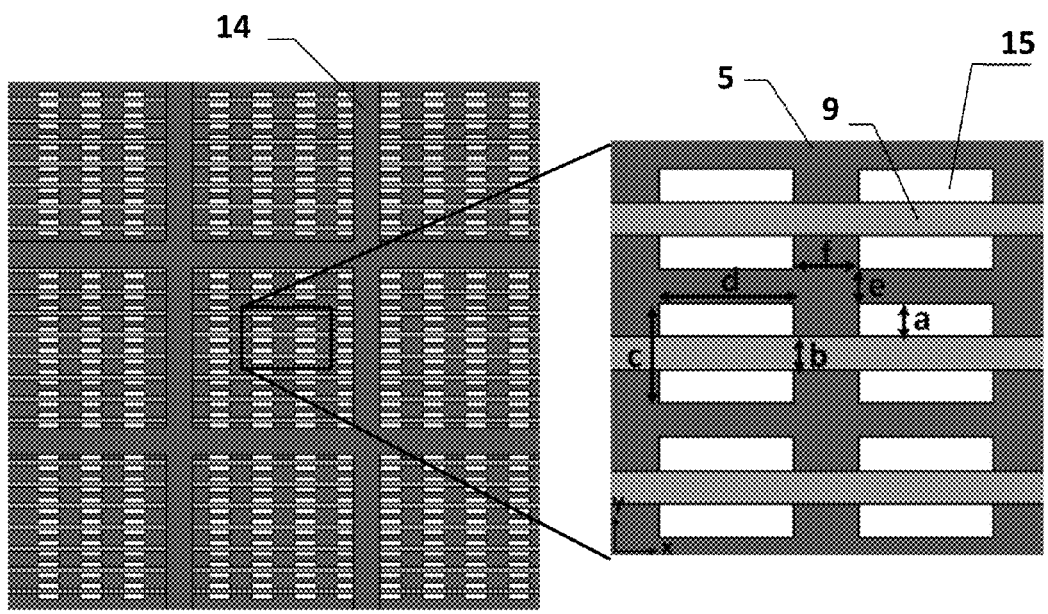
FIG. 2 is a top-view of the multilayer micro-fabricated membrane, which shows the critical dimensions.

As an example, the method of preparing the multilayer membrane itself is described below. FIG. 1 shows a cut-view of multilayer polymeric membrane schematically, generally at 16, embodying the present invention. In accordance with the present invention, micro/nano-filter membrane includes at least a filter layer that comprises an array of mono-sized pores, and a support layer that includes a precision-shaped support structure (FIG. 2). FIG. 3 also shows the schematic cross-sectional and 3-D view of the fabrication process in details. For the purpose of illustration, the filter membrane as shown in FIG. 2 is not to scale. Although, theoretically, the support layer could have a thickness in order of membrane thickness, more typically the filter layer will be substantially thinner than the support structure. In the present invention, the filter layer thickness can be between 0.05-500 μm while the support structure has the thickness of around 0.1 μm-5 mm. The thickness of both the membrane and the support structure can be varied, depending on the desired pore size, pore shape, porosity and filter strength. One filter design for capturing *C. parvum* oocysts has the thickness of around 40 μm (i.e. both membrane and support) and pore size of 3×12 μm.
(i) Fabrication of perforated polymeric membrane (first layer)
(ii) SU-8 2010 and SU-8 2015 (MicroChem corp.) were used for the development of multilayer polymeric membrane. The method is described with reference to FIG. 3. First, a silicon substrate 1, <100>, p-type, was cleaned in piranha solution (96% $H_2SO_4$ and 30% $H_2O_2$) for 25 minutes at 120° C. to remove any organic contaminations on the wafer surface. Then, the substrate 1 was submerged in the buffered oxide etchant (BOE) for 3 minutes to clean the natural oxide layer. This step has a significant impact on the adhesion of the sacrificial layer to the substrate. After rinsing with DI water and drying with $N_2$ gas, the dehydration bake step was performed in Suss machine (Delta 150 VPO) for 2 minutes. To facilitate the release of the membrane from the substrate, a thin layer of positive photoresist (sacrificial layer) 2 (AZ6220) was spin-coated on the silicon wafer 1 and cured on a hot plate at 100° C. for 10 minutes (FIGS. 3(*a*), and (*b*)). After curing the sacrificial layer 2 (i.e. AZ6220 film) and cooling down the wafer 1 to the room temperature, a thin layer of SU-8 photoresist 3 (SU-8 2010) was spin-coated on the top of the cured sacrificial layer 2 (FIGS. 3(*c*), and (*d*)). In order to avoid bubbles, the photoresist was poured onto the substrate directly from a bottle with a large aperture. In another aspect of the present invention, we can employ any dissolvable polymer or metal (i.e. with an appropriate solvent or etchant) such as PMMA, Polyamide, Copper, Gold, Aluminium and, etc. as a sacrificial during microfabrication. For the membrane itself, we can also use any kind of negative photoresists such as Polyimide, PMMA, PMGI and, etc. After soft baking the SU-8 photoresist 3 on the hot plate (i.e. at 95° C. for 5 minutes), a chrome coated glass mask 4 with rectangular features (b and c parameters in FIG. 2) was used to transfer the patterns into the SU-8 photoresist 3. The pitch size in the first mask 4 can be varied for different applications based on the desired porosity (f and e parameters in FIG. 2). It is clear that by increasing the pitch size (i.e. pores distance in the x and y directions) the membrane porosity will be decreased. UV-Lithography was carried out by Karl Suss MA6 mask aligner (Karl Suss Inc.) in the vacuum contact mode between the silicon wafer and the mask at 365 nm wavelength. Then SU-8 resist 3 was kept again on the hot plate for around 3 minutes for post-exposure at 95° C. and cooled down to the room temperature for relaxation purpose for 10 minutes. In this step, the cationic photo-polymerization of the epoxy is performed. As shown in (FIGS. 3(*e*), and (*f*)), those exposed areas 5 are cross-linked and forming a structural layer of the final filter, and the unexposed areas 6 will be removed by solvent, at this step or at a later step of the process, such as the step shown in (FIGS. 3(*o*), and (*p*)).

The main purpose of using a second layer on top of the first layer is to reduce the pore size according to the desired application (i.e. up to hundreds of nanometer). As discussed earlier, due to the non-uniform UV exposure dose in a thick SU-8 film, usually the top layer is overexposed and tends to be wider than the bottom layer which is relatively underexposed, resulting in pore closure. To solve this problem, proposed herein is a novel solution to make large holes 10 μm) in the first layer and then reduce the pore size by laying parallel strips in the middle of the pores. For this purpose, a second layer of SU-8 2010 7 was spin-coated on top of the first layer (FIGS. 3(*g*), and (*h*)). After soft baking the second layer 7 on the hot plate (i.e., at 95° C. for 5 minutes, 10 minutes relaxation at 25° C.), another quartz/chrome mask 8 with array of strips features was used to transfer the pattern precisely in the middle of the previous features 6. The thickness of strips (parameter a in FIG. 2) used for the present invention can be variable based on the desired application. Alignment of the second mask 8 with patterns on the first layer 3 was carried out using precise microscopes of Karl Suss MA6 mask aligner. After exposing the second layer, wafer 1 was kept again on the hotplate at 95° C. for post exposure and cooled down to the room temperature for relaxation purpose for 10 minutes. Similar to the previous step, FIGS. 3(*i*), and (*j*) show that those exposed areas 9 are cross-linked and forming a structural layer of the final filter, and the unexposed areas 10 will be removed by solvent, at this step or at a later step of the process, such as the step shown in FIGS. 3(*o*), and (*p*). In another embodiment of the present invention, the sieving layer (layer one and two together) can be made from dry photoresists (i.e. overlay together using lamination) using lithography or stamping. There is also a possibility to make these layers (i.e. one or both of them) with metal deposition using sputtering or electroplating techniques.

For patterning both the first and the second layer or the subsequent support layer, one or more of the following patterning techniques can also be used: hot embossing, micro- and nano-molding and casting, electron beam lithography, nano imprinting, pattern transfer by stamping, interferometry lithography, x-ray or proton lithography, inkjet pattern deposition, micelle and other self-assembly of particles and molecules, amplification of electrohydrodynamic instabilities [Chou S Y, et al, J Vac Sci Tehcnology, B 1999; 17:3197], micro or nano templates such as anodized porous alumina sheets, etc.

Figure 12A:
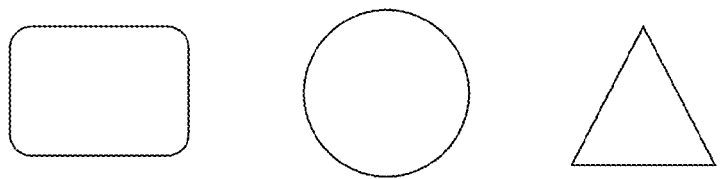
FIG. 12 (a) shows various shapes of pore openings having low aspect-ratio.
Figure 12B:

The filter pore may have various shapes which can be either a pore opening of low aspect-ratio, as shown in FIG. 12(*a*), in which the dimension of the opening in all directions are nearly the same, or a pore opening of high aspect-ratio, as shown in FIG. 12(b), in which the dimension of the opening in all directions are significantly different.

Figure 13A:
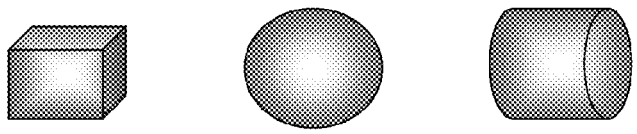
FIG. 13(a) shows various shapes of particles having low aspect-ratio.
Figure 13B:
FIG. 13 (b) shows various shapes of particles having high aspect-ratio.
Figure 14:
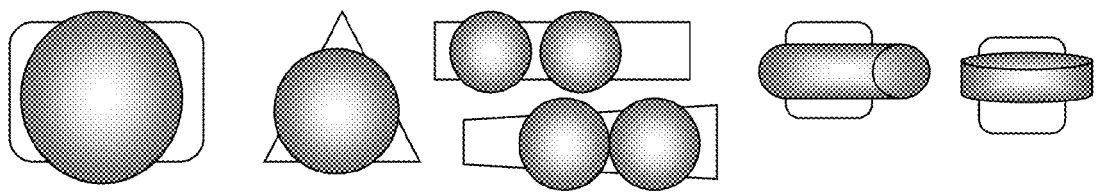
FIG. 14 shows schematics of blocking particles of various shapes on pore openings of various shapes.

The particles may have various shapes having either low-aspect-ratio, as shown in FIG. 13(a), in which the dimension of the particles in all directions are nearly the same, or shapes of high-aspect-ratio, as shown in FIG. 13(b), in which the dimension of the particles in all directions are different significantly. During the particle filtration or separation process, the filter pore shape should be designed to suit the shape of the particle of interest. FIG. 14 shows a few examples of choosing suitable shapes of pore openings for given particles of certain shapes. The opening size which is designed to suit the size and shape of the particles of interest can be in the range of 10 nm-5 mm which can be the smallest size of the opening or the largest size of the opening.

Figure 3A:
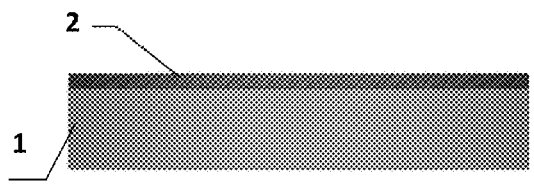
FIGS. 3(a)-3(r) depict the cross-sectional and 3-D schematic diagrams of the fabrication process.
Figure 3B:
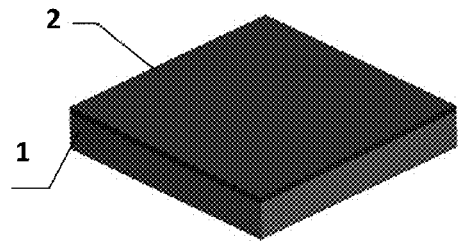
Figure 3C:
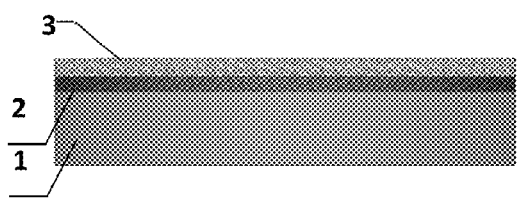
Figure 3D:
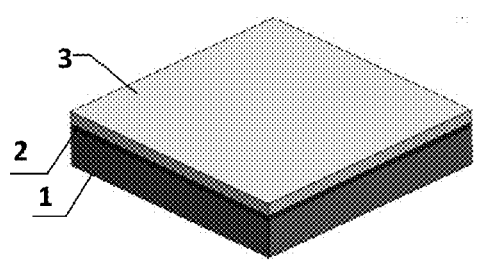
Figure 3E:
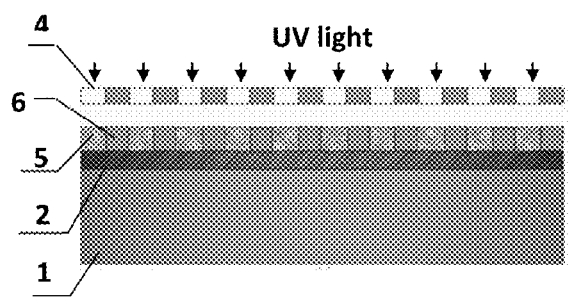
Figure 3F:
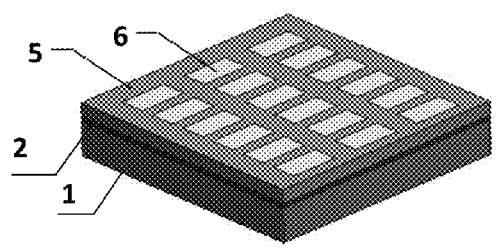
Figure 3G:
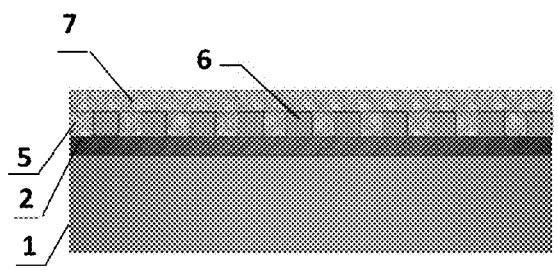
Figure 3H:
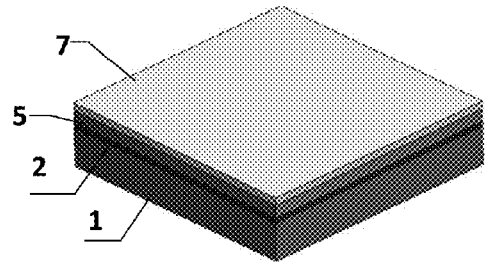

(iii) Fabrication of the Support Structure (Third Layer)
(iii.1) Polymeric Support Layer The perforated SU-8 film 3 is too thin and will fold upon release from the substrate 1; therefore, a backside support with large openings was constructed from a thick layer of SU-8. For this purpose, a third layer of SU-8 11 (SU-8 2015, MicroChem corp.) film with a large thickness was spin-coated on top of the second layer (FIGS. 3(k) and (l)). After soft baking on the hotplate for around 20 minutes, third exposure through a plastic mask 12 with square shape (or honeycomb) openings was carried out to form the support layer in the backside of the membrane. After the third exposure, the substrate 1 was held on the hotplate for around 25 minutes for post-exposure and also good adhesion to the second layer. FIGS. 3(m), and (n) show that those areas 14 that were exposed cross-linked, and the areas 13 that did not receive UV light will be removed during a resist development step. After cooling down to the room temperature, all SU-8 levels were subsequently developed simultaneously. This single developing step process provides important advantages over a process where each coated layer is developed prior to coating of subsequent layers. For example, simultaneous development of multiple SU-8 layers significantly reduces the processing time. Additionally, coating uniformity is increased compared to a process that coats over the topography of previously patterned layers (FIGS. 3(o), and (p)).

(iii.2) Support layer made from silicon

In an alternative embodiment of the filter according to the invention, the membrane support 14 can be made by anisotropic etching of Si wafer using KOH like the process in reference [7]. For this purpose, we have used a double-sided polished silicon wafer in which we have made the sieving layer 5, 9 (i.e. both layers together) on one side and back-side etching of the Si wafer 1 from other side using KOH. In this case, it is not required to release the membrane from the Si substrate 1. With this technique, we can make a metallic micro/nano filter on top of a Si wafer 1 with different thickness (i.e. 100-1000 μm) which is etched anisotropically or isotropically using KOH or deep reactive ion etching (DRIE), respectively. A great explanation of the back-side etching can be found in reference [7].

(iv) Release of the Polymeric Multilayer Membrane

The most important impediment in fabrication of the polymeric micro/nano-filter with this method is the release of the multilayer micro-fabricated membrane 16 from the substrate 1 without membrane failure. Backside support 14 helps the membrane to stay flat upon release from the substrate 1, but high thickness of the support structure 14 will cause the entire structure to collapse and adhere to the substrate when the sacrificial layer starts to dissolve in the solvent. Therefore, finding a suitable material to be used as a sacrificial layer 2 for the releasing step is an important issue. In the literature, some methods have been proposed for this purpose, like sputtering (or electroplating) copper [12] or chromium [13] as a sacrificial layer 2 beneath the SU-8 film 3 and etching the metal film in the final step. Using metals like copper or chromium will cause the imposition of extra steps like sputtering and also use of toxic material as an etchant for sacrificial layer removal. Instead of using metals as a sacrificial layer, appropriate polymers and solvents for release purpose may be employed. Table 1 shows some materials that were used as a sacrificial layer 2 in this study. All the solvents have no effect on the cured SU-8 film.

TABLE 1

Materials and process conditions that have been used for the release of micro/nano-filter from the substrate.

| Material | Solvent | Curing process | Release step |
|---|---|---|---|
| AZ 9260 | Acetone | Thickness 2 μm @ 110° C. for 20 min. | Immerse in acetone bath for 15 min. (with ultrasonic agitation) |
| PMMA | Chloroform | Thickness 2 μm @ 95° C. for 25 min. | Immerse in Chloroform bath for 5 min. (without ultrasonic agitation) |
| Polystyrene | Toluene | Thickness 2 μm @ 90° C. for 10 min. | Immerse in Toluene bath for 15 min. (with manual agitation) |
| Polyurethanes | DMF | Thickness 2 μm @ 80° C. for 30 min. | Immerse in DMF bath for 15 min. (with ultrasonic agitation) |

By performing several experiments, it was realized that AZ 9260 and polystyrene[14] presented better results in the releasing step regarding the film quality and complete dissolution in the solvent (FIGS. 3(q), and (r)).

Depending on the thickness of the backside support layer 11, it takes between 10-20 minutes to release the membrane from the substrate in pertinent solvent. Ultrasonic agitation is necessary for releasing the multilayer membrane 16 from the substrate 1 because, firstly, it expedites the releasing process and secondly, it prevents the adhesion of the final membrane 16 to the substrate 1 when the sacrificial layer 2 dissolves in the solvent.

The following parameters in the mask designs (see FIG. 2) were employed in the present invention to fabricate polymeric multilayer membrane suitable for isolation of C. parvum oocyst:

| a | b | c | d | e | f |
|---|---|---|---|---|---|
| 3 μm | 3 μm | 9 μm | 12 μm | 2 μm | 4 μm |

Figure 4:
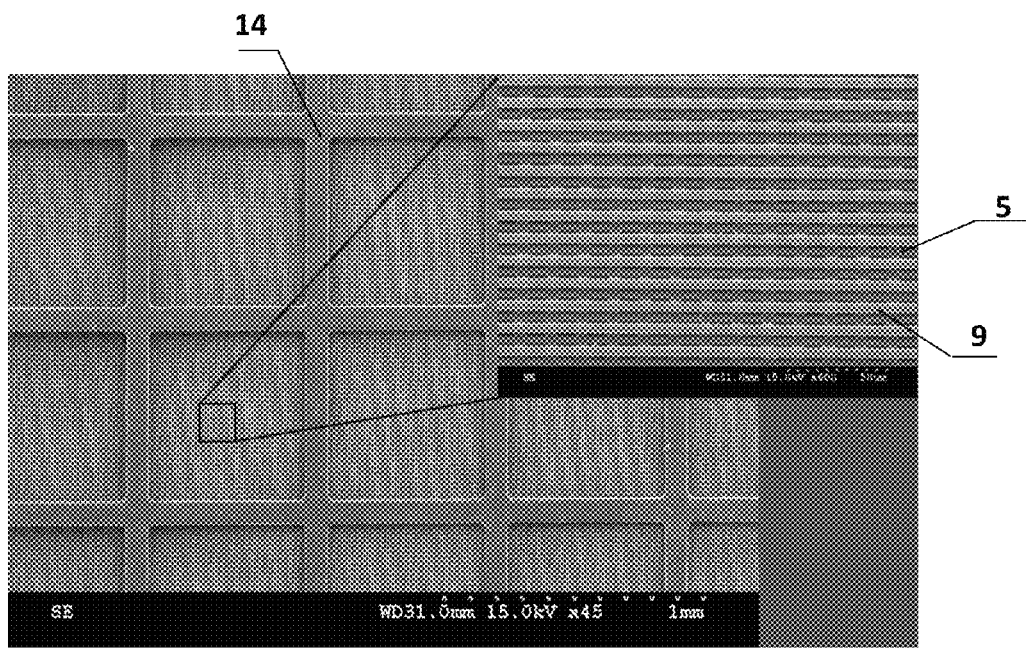
FIG. 4 shows an SEM image of a multilayer micro-fabricated membrane with square shape integrated back-support. Close-up view shows the perforated membrane.
Figure 5:
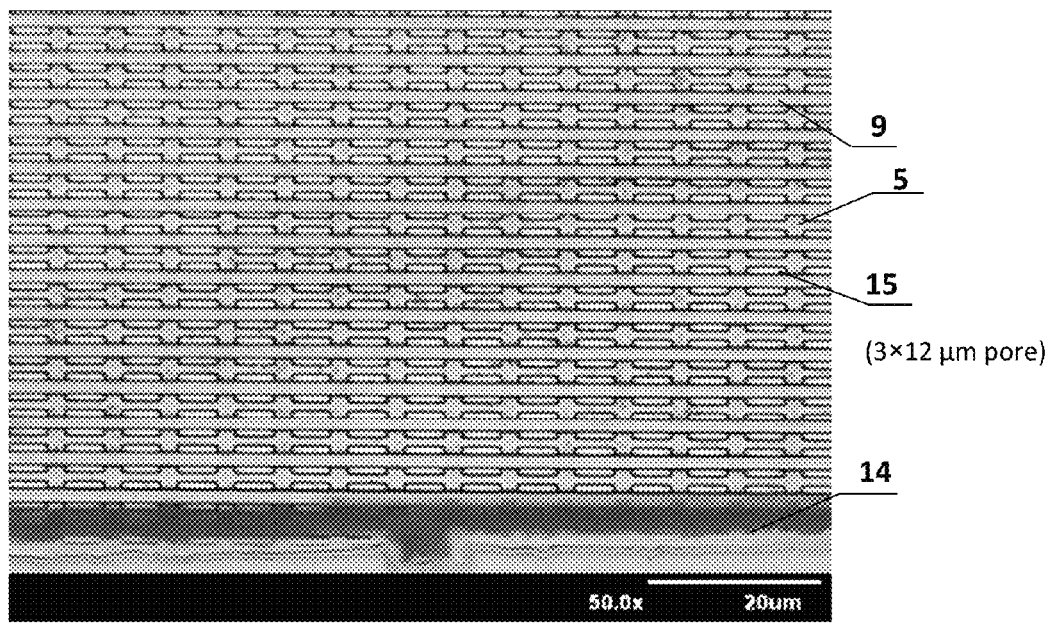
FIG. 5 illustrates an optical image of a multilayer polymeric membrane.

FIG. 4 shows an SEM image of a multilayer polymeric membrane with the slotted pores and square-shape back support. The optical image of the membrane (FIG. 5) shows the membrane structure clearly. It can be seen that the second layer is perfectly placed in the middle of the first layer and the pore size is reduced. The final pore size 15 of the membrane was 3×12 μm.

Figure 6:
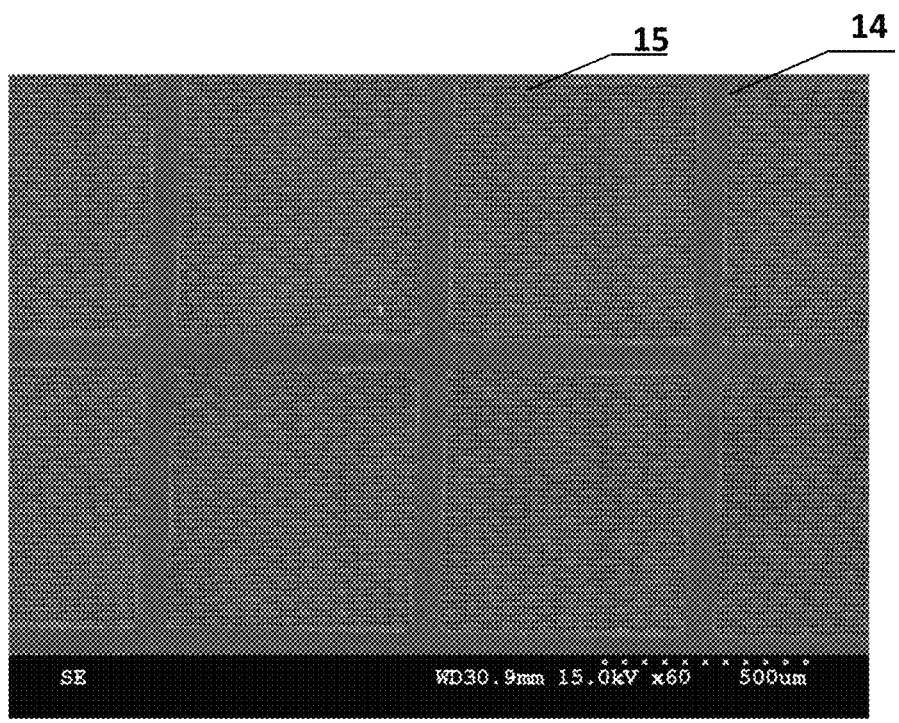
FIG. 6 is a back-side view of a micro-fabricated multilayer membrane with slotted openings (3×12 μm) and integrated support mesh.

FIG. 6 depicts the back-side view of a multilayer microsieve. This picture reveals that the obtained membrane has a smooth surface and high porosity, which make it ideal for microfiltration of biological samples like blood cells or isolation of microorganisms such as C. parvum oocysts. It should be noted that the support's openings must be large enough so as to not contribute any significant effect to the total hydraulic resistance to flow across the membranes [7].

Figure 7:
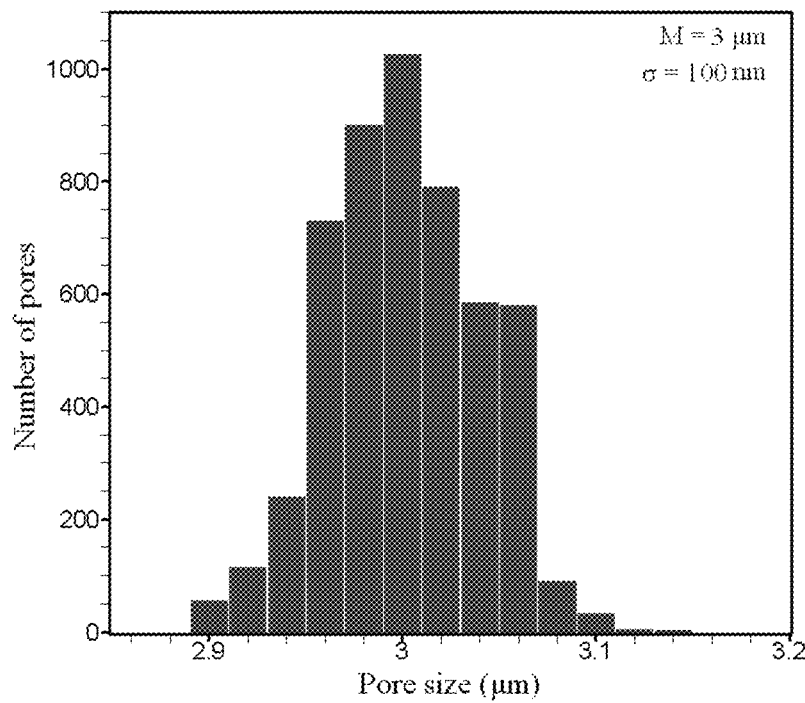
FIG. 7 shows the pore size distribution of a multilayer membrane with 3×12 μm slotted pores.

The measurement of the pore-size distribution of the SU-8 membranes was carried out using digitalized photographs from HITACHI S3500 scanning electron microscope machine, which is equipped with the 'in-built dimension measurement' module and image analysis program SEMI-CAPS 2200 (Semicaps Pte Ltd) from random regions of the samples. The mean pore width and standard deviations were 3 μm and 100 nm, respectively. Therefore, corresponding coefficient of variation (CV=σ/M) is 3.33% and 3%, respectively. By employing multilayer technology, membranes with pore density of about $6 \times 10^7$ pores/cm$^2$ were fabricated. The pore density of the polymeric micro-fabricated membrane is much higher than the commercial filter like polymeric track-etched membrane with CV and average pore density of around 20% and $10^7$ pores/cm$^2$, respectively. The histogram of the analyzed samples is depicted schematically in FIG. 7.

EXAMPLE 2

Applications of the Filter (a) Isolation of *C. parvum* Oocysts

Figure 8:
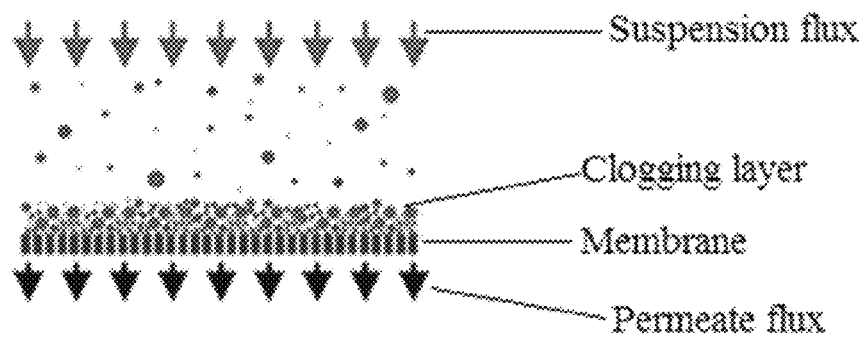
FIG. 8 shows a schematic representation of the dead-end filtration mechanism. (This is used in our microfiltration tests).
Figure 9:
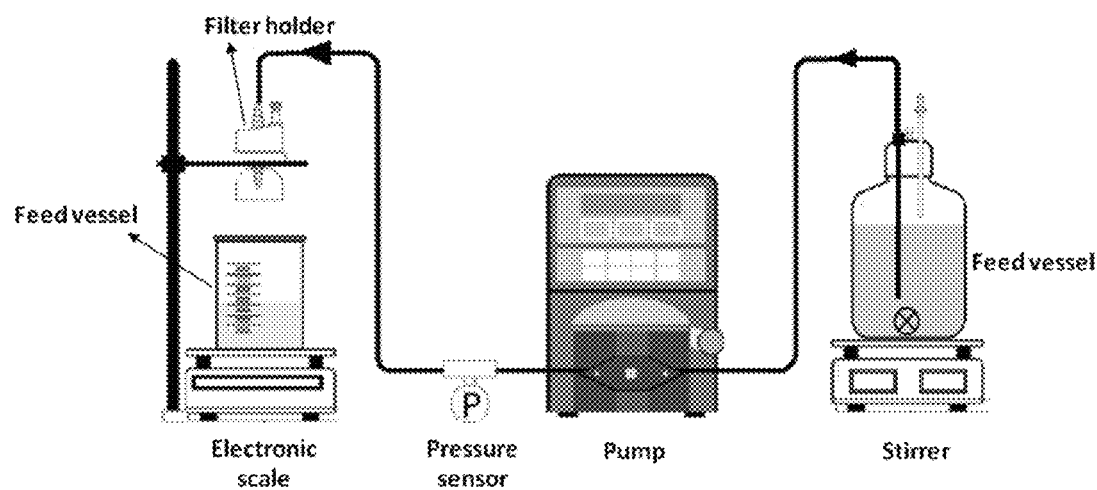
FIG. 9 represents the schematic of the experimental setup used for the experiments.
Figure 10:
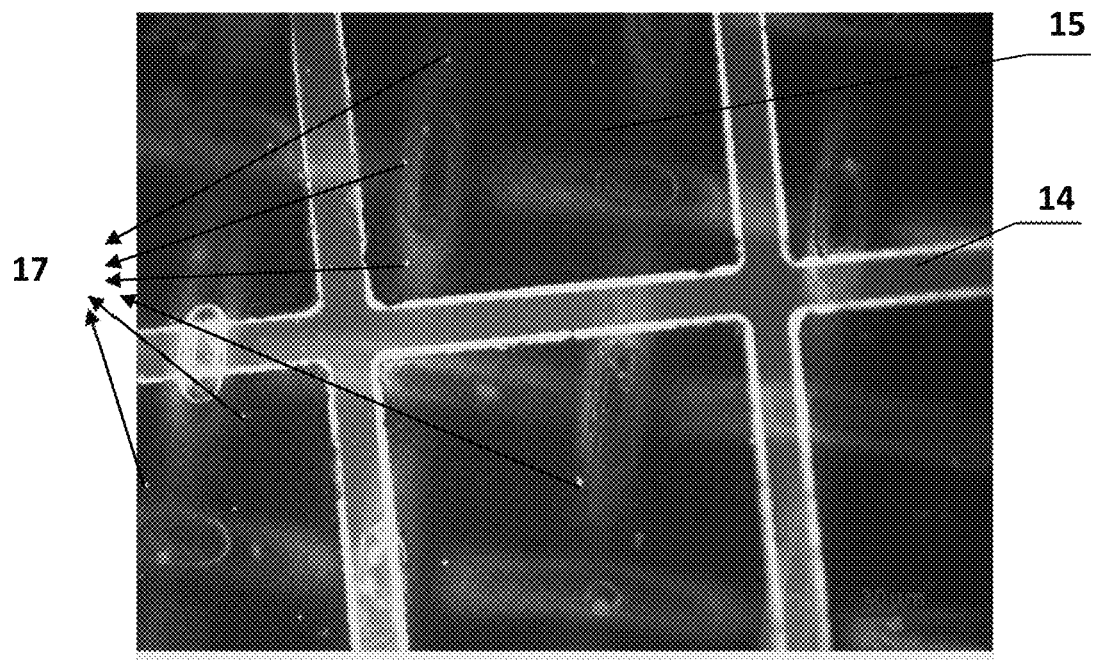
FIG. 10 shows a microscopic image of part of the polymeric micro-fabricated membrane after filtration with trapped oocysts on the membrane surface.

The capturing capability of the multilayer polymeric filter was verified by a two-step *C. parvum* oocysts filtration method. In the first step, 10 L of the sample, which was pure water (collected from a Millipore purification unit (MilliQ plus)) spiked with $2 \times 10^3$ heat inactivated *C. parvum* oocysts (Waterborne Inc. New Orleans, La., USA, Cat No: P102C@1×10$^6$) was filtered using a multilayer polymeric micro-sieve. The filtration was performed in dead-end mode using a peristaltic pump at a flow rate of 2 L min$^{-1}$. The schematic representation of the filtration process and also experimental setup is illustrated in FIGS. 8 and 9, respectively. Upon completion of filtration, containers were rinsed with 2 liters of pure water that were additionally filtered. Then the filtered water goes to a subsequent filtration step using an Anodisc membrane (Whatman, Cat No: 6809-5522) with nominal pore size of 0.2 μm to capture any oocyst that may pass through the multilayer polymeric micro-sieve. *C. parvum* oocysts attached to both filters were observed under a fluorescence microscope by FITC (fluorescence iso-thiocyanate) technique (Waterborne. Inc., New Orleans, La., USA, Cat No: A400FLK). Microscopic observations revealed that all oocysts were captured by the multilayer polymeric micro-sieve, and no oocyst was found on the second filter (i.e. the Anodisc filter). FIG. 10 shows a part of the polymeric micro-sieve after filtration of *C. parvum* oocysts. The trapped oocysts 17 can be seen on the surface of the membrane.

In order to check the recovery rate, the multilayer micro-sieve was back-flushed with an appropriate buffer (i.e. 1% sodium polyphosphate (NaPP) and 0.1% Tween 80) to recover the oocysts from the surface. The back-flush was carried out using the peristaltic pump under 0.2 bar pressure for 2 minutes. The following optical observations of the filter membrane showed that more than 90±5% of *C. parvum* oocysts were recovered. Unique features of the multilayer polymeric micro-sieve like the smooth surface and uniform pore-size greatly reduce the oocyst adhesion to the filter surface and enable us to achieve a very high recovery rate in comparison to the commercially available filters for this purpose.

The same experiments have been performed to compare and evaluate the performance of polymeric micro-fabricated filter and Envirochek HV filter. The obtained results indicate that the micro-fabricated membrane filter was superior to Envirochek HV for recovery of oocysts with a 95-99% recovery rates. Unique features of the polymeric micro-fabricated filter like the smooth surface, straight pore path and uniform pore-size greatly reduce the oocyst adhesion to the filter surface and enable us to achieve a very high recovery rate (up to 99%) of *C. parvum* oocysts when applying backflush or lateral swing.

Sample loading and back-flushing using the present micro/nano-filter resulted in 95-99% recovery with a concentration ratio of above 2000 of the *C. parvum* oocysts spiked, which showed an improved performance compared to the current commercial filters.

Filtration Throughput

Figure 11:
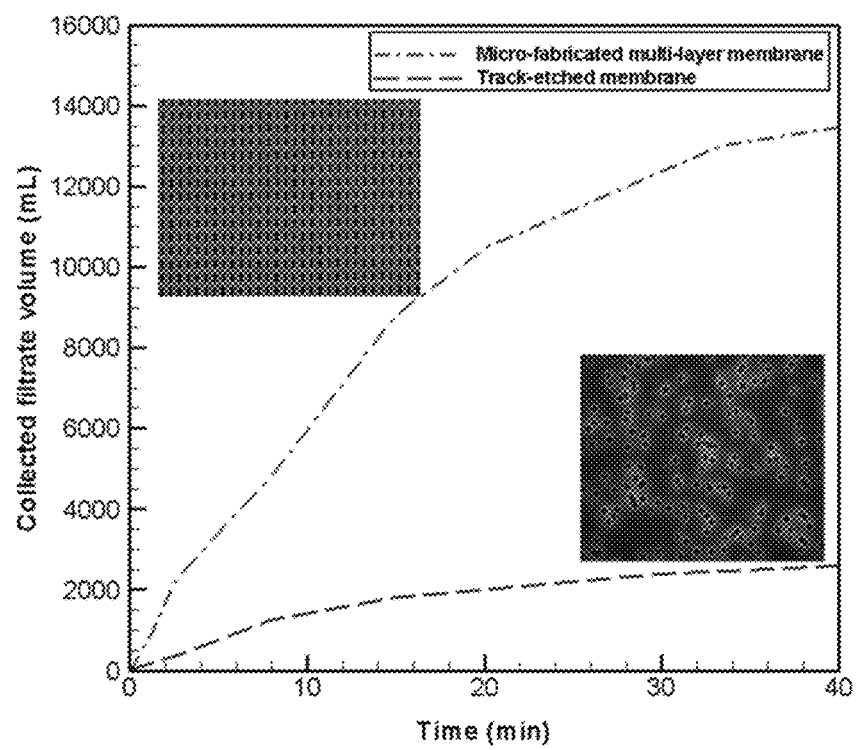
FIG. 11 depicts the filtration throughput of the micro-fabricated filter versus track-etched membrane for filtration of tap water at a pressure of 1 bar and turbidity of 0.5 NTU.

FIG. 11 illustrates the filtrate collection volume data of the micro-fabricated multilayer membrane and a track-etched polycarbonate membrane (Millipore, pore size of 3 μm, Cat No: TSTP02500) under a constant pressure condition using tap-water. The operating pressure was 0.5 bar and the turbidity was around 0.4 NTU. The thickness of both membranes was 20 μm. A pressurized container was used to generate constant pressure filtration data. Permeate was collected in a container located on an electronic scale. The results indicate that the micro-fabricated polymeric filter has a higher throughput in comparison to the track-etched membrane for the same purpose (i.e. five times more). This can be attributed to the higher porosity and slit shape openings of the multilayer membrane. Experiments were performed in triplicate and presented results are the average of the measurements.

Reusability and Other Applications

Commercial membranes are not designed to be reusable, and they can hardly retain their initial status after the filtration and backflushing process while the polymeric micro-fabricated filter can easily retain its original condition with a simple backflushing or lateral shaking process. Hence, a long lifetime and the ability to be cleaned easily make the micro-fabricated multilayer filters a good choice for large scale applications where conventional filters must be replaced regularly, like in the water purification industry or in wineries.

Since micro-fabricated multilayer filter has unique properties like high porosity, smooth surface and biocompatibility, it can be used for a variety of applications like filtration of the white blood cells (leukocytes) from blood-cell concentration, cell culture, yeast filtration, detection of microorganisms and air monitoring.

(b) Healthcare Related Applications:

1) Biosensors: as a barrier offering controlled diffusion for biological reagents and electrochemical detectors.

2) Diagnostic assays: for flow control, sample preparation, blood separation (i.e. separation of CTC's from other blood cells or separation of WBC from RBC), and capture of latex microparticles. They can be used also for in vitro applications including diagnosis and protein separation.

3) Cell biology: for cell culture, chemotaxis, and cytological analyses (i.e. direct staining, isotopic and fluorescence based assays).

4) Transdermal drug delivery: as an inert matrix for the retention of therapeutics.

5) Hemodialysis: removing waste products such as creatinine and urea, as well as free water from the blood when the kidneys are in renal failure.

6) Single Molecular Analysis: a promising tool in probing biomacromolecules (DNA, RNA, and proteins) one by one for single-molecule analysis.

7) Nucleic acid studies: Alkaline elution and DNA fragment fractionation.

(c) Additional Applications:

1) Water analysis: Absorbable organic halides (AOX), direct count of microorganisms, marine biology and dissolved phosphates, nitrates, and ammonia analysis.

2) Air monitoring: Trace elements (chemicals, radioactivity) and particulate analysis (dust, pollens, and airborne particles).

4) General filtration: Particulate and bacteria removal, cross flow filtration, HPLC sample preparation, and solution filtration (i.e. milk filtration, oil filtration and etc).

5) Microscopy: Electron microscopy, epifluorescence microscopy, and direct optical microscopy 6) Microorganism analysis: Direct total microbial count, harvesting, concentration, fractionation, yeast, molds, *Giardia*, *Legionella*, coliform, and canine microfilaria.

8) Oceanographic studies: Transparent micro-fabricated or track etched membrane filters provide a new tool for studying planktonic organisms. These ultra-thin transparent membranes are strong yet flexible, allowing for planktonic samples to be filtered and the membranes to be mounted directly onto microscope slides.

9) Fouling investigation: Transparent micro-fabricated membranes can be employed as a great tool for investigation of mechanism of fouling on the surface of micro/nano filters.

REFERENCES

[1] Inoue M, Rai S K, Oda T, Kimura K, Nakanishi M, Hotta H and Uga S 2003 A new filter-eluting solution that facilitates improved recovery of *Cryptosporidium* oocysts from water *Journal of Microbiological Methods* 55 679-86

[2] Noble R T and Weisberg S B 2005 A review of technologies for rapid detection of bacteria in recreational waters *Journal of water and health.* 3 381-92

[3] Dubitsky A, DeCollibus D and Ortolano G A 2002 Sensitive fluorescent detection of protein on nylon membranes *Journal of Biochemical and Biophysical Methods* 51 47-56

[4] Ramachandran V and Fogler H S 1999 Plugging by hydrodynamic bridging during flow of stable colloidal particles within cylindrical pores *Journal of Fluid Mechanics* 385 129-56

[5] Wohlsen T, Bates J, Gray B and Katouli M 2004 Evaluation of Five Membrane Filtration Methods for Recovery of *Crytosporidium* and *Giardia* Isolates from Water Samples *Applied and Environmental Microbilogy* 70 2318-22

[6] Kuiper S, Van Rijn C J M, Nijdam W and Elwenspoek M C 1998 Development and applications of very high flux microfilitration membranes *Journal of Membrane Science* 150 1-8

[7] Van Rijn 1998 Membrane filter and a method of manufacturing the same as well as a membrane, U.S. Pat. No. 5,573,014.

[8] Yanagishita T, Nishio K and Masuda H 2007 Polymer through-hole membrane fabricated by nanoimprinting using metal molds with high aspect ratios *Journal of Vacuum Science and Technology B: Microelectronics and Nanometer Structures* 25 L35-L8

[9] Han K, Xu W, Ruiz A, Ruchhoeft P and Chellam S 2005 Fabrication and characterization of polymeric microfiltration membranes using aperture array lithography *Journal of Membrane Science* 249 193-206

[10] Gironés M, Akbarsyah I J, Nijdam W, van Rijn C J M, Jansen H V, Lammertink R G H and Wessling M 2006 Polymeric microsieves produced by phase separation micromolding *Journal of Membrane Science* 283 411-24

[11] Lorenz H, Despont M, Fahrni N, Brugger J, Vettiger P and Renaud P 1998 High-aspect-ratio, ultrathick, negative-tone near-UV photoresist and its applications for MEMS *Sensors Actuators A* 64 33-9

[12] Yi F, Tang E, Zhang J and Xian D 2000 A new sacrificial layer method of LIGA technology to fabricate movable part of a gripper *Microsystem Technologies* 6 154-6

[13] Calleja M, Tamayo J, Johansson A, Rasmussen P, Lechuga L and Boisen A 2003 Polymeric cantilever arrays for biosensing applications *Sensor letters* 11-5

[14] Luo C, Govindaraju A, Garra J, Schneider T, White R, Currie J and Paranjape M 2004 Releasing SU-8 structures using polystyrene as a sacrificial material *Sensors and Actuators, A: Physical* 114 123-8

The invention claimed is:

1. A multilayer filter comprising at least a first layer comprising a plurality of openings and at least a second permeable layer overlaying the first layer and reducing the size of the openings, wherein the overlaying second layer comprises a configuration partitioning substantially every individual opening to reduce its size, and wherein the configuration of the second layer comprises an array of strips partitioning the openings.

2. The multilayer filter according to claim 1, further comprising one or more successive permeable layers overlaying the second layer, wherein each layer further successively reduces the size of the openings.

3. The multilayer filter according to claim 1, wherein the largest dimension of an opening is ≤500 μm.

4. The multilayer filter according to claim 1, further comprising at least one supporting permeable layer.

5. The multilayer filter according to claim 1, wherein the layers are coherent.

6. A method for fabricating a multilayer filter, comprising the steps of:
   (i) depositing a sacrificial layer on a substrate;
   (ii) depositing a first layer onto the sacrificial layer; either
   A)(iii) identifying on the first layer a first pattern comprising regions to be removed for so as to form a plurality of openings in the first layer;
   (iv) depositing at least a second layer to overlay the first layer;
   (v) identifying on the second layer a second pattern comprising regions to be removed so as to form a configuration in the second layer; and fabricating a plurality of openings in the first layer according to the first pattern and fabricating a configuration in the second layer according to the second pattern, wherein the configuration reduces the size of the openings of the first layer; or
   B)(iii) fabricating a plurality of openings in the first layer;
   (iv) depositing at least a second layer to overlay the first layer;
   (v) fabricating a configuration in the second layer, wherein the configuration reduces the size of the openings of the first layer;
   and for (A) or (B), (vi) releasing the layers minus the sacrificial layer from the substrate to give the multilayer filter, wherein the configuration of the second layer comprises an array of strips partitioning the openings.

7. The method according to claim 6, wherein the configuration partitions substantially every individual opening, thereby reducing the size of the openings.

8. The method according to claim 6, wherein step (ii) comprises depositing a first photoresist layer onto the sacrificial layer.

9. The method according to claim 8, wherein step A(iii) comprises contacting the first photoresist layer with a mask comprising a pattern of a plurality of openings to be copied to the first photoresist layer and exposing the masked first photoresist layer to a suitable light source or step B(iii) comprises contacting the first photoresist layer with a mask comprising a pattern of a plurality of openings to be copied to the first photoresist layer and performing photolithography to form a plurality of openings on the first photoresist layer.

10. The method according to claim 6, wherein step A(iv) or B(iv) comprises depositing at least a second photoresist layer onto the first layer.

11. The method according to claim 10, wherein step A(v) comprises contacting the second photoresist layer with a mask comprising a pattern of a configuration to be copied to the second photoresist layer and exposing the masked second photoresist layer to a suitable light source or step B(v) comprises contacting the second photoresist layer with a mask comprising a pattern of a configuration to be copied to the photoresist layer and performing photolithography to form a configuration on the second photoresist layer; wherein the configuration of the second layer reduces the size of the openings of the first layer.

12. The method according to claim 6, wherein the largest dimension of an opening is 500 μm.

13. The method according to claim 6, further comprising fabricating at least one supporting permeable layer over the multilayer filter.

14. A method of preparing a filter comprising the steps of:
 (i) fabricating a first layer comprising a plurality of openings;
 (ii) fabricating at least a separate second permeable layer comprising a configuration;
 (iii) positioning the second layer to overlay the first layer, wherein the configuration of the second layer reduces the size of the openings, and wherein the configuration of the second layer comprises an array of strips partitioning the openings.

15. The method according to claim 14, further comprising fabricating one or more successive permeable layers to overlay the second layer, wherein each successive permeable layer further successively reduces the size of the openings.

16. The method according to claim 14, wherein the filter further comprises at least one supporting permeable layer.

17. The method according to claim 16, wherein the supporting permeable layer comprises a grid structure.

18. The method according to claim 6, wherein the layers are coherent.

* * * * *